United States Patent [19]
Ohashi

[11] Patent Number: 4,579,018
[45] Date of Patent: Apr. 1, 1986

[54] BAND SELECTOR SWITCH

[75] Inventor: Yoshihiro Ohashi, Miyagi, Japan
[73] Assignee: Alps Electric Co., Ltd., Japan

[21] Appl. No.: 552,503
[22] Filed: Nov. 17, 1983
[30] Foreign Application Priority Data
Nov. 18, 1982 [JP] Japan ........................... 57-173487[U]
Nov. 18, 1982 [JP] Japan ........................... 57-173488[U]
[51] Int. Cl.[4] ......................... G05G 5/06; F16H 35/18; B25G 3/28; H01H 3/08
[52] U.S. Cl. ...................................... 74/531; 74/10.41; 74/526; 74/527; 74/553; 200/336; 200/291; 403/289; 403/359
[58] Field of Search ................. 74/553, 528, 527, 554, 74/555, 556, 557, 531, 10.41, 526; 403/354, 289, 359, 375; 16/121, 118, 123, DIG. 30, DIG. 40; 200/153 L, 153 LA, 291, 307, 329, 155 R, 155 A:336, 17 R, 4

[56] References Cited
U.S. PATENT DOCUMENTS
B 470,170 1/1976 Robinson ........................... 74/10.41
3,780,245 12/1973 Beddow .......................... 200/155 R
4,052,033 10/1977 Taylor .................................. 74/527
4,175,220 11/1979 Johnston et al. ................. 200/17 R
4,227,056 10/1980 Johnston et al. ....................... 200/4
4,348,569 9/1982 Golbeck et al. ................ 200/155 R
4,455,886 6/1984 Schmitt ............................. 74/10.41

*Primary Examiner*—Kenneth J. Dorner
*Assistant Examiner*—Vinh Luong
*Attorney, Agent, or Firm*—Guy W. Shoup

[57] ABSTRACT

A band selector switch comprises a rotor having click teeth on its outer circumferential surface, a sleeve rotatably fitted in the rotor and composed of a plurality of axial resilient pieces separated by axial slits defined in the sleeve, the resilient pieces having click grooves defined in inner peripheral surfaces thereof for engaging the click teeth, one of the resilient pieces being deformable radially outwardly, and stop surfaces disposed radially outwardly of those resilient pieces disposed on opposite sides of the one deformable resilient piece for preventing the resilient pieces on opposite sides of the deformable resilient piece from being deformed radially outwardly. The click teeth are prevented by the undeformable resilient pieces from entering the latter, thus limiting the range of angular movement of the rotor.

8 Claims, 4 Drawing Figures

BAND SELECTOR SWITCH

BACKGROUND OF THE INVENTION

The present invention relates to a band selector switch for use on a television receiver.

SUMMARY OF THE INVENTION

It is an object of the present invention to provide a band selector switch capable of proper band selection.

According to the present invention, there is provided a band selector switch comprising a rotor having click teeth on its outer circumferential surface, a sleeve rotatably fitted in the rotor and composed of a plurality of axial resilient pieces separated by axial slits defined in the sleeve, the resilient pieces having click grooves defined in inner peripheral surfaces thereof for engaging the click teeth, one of the resilient pieces being deformable radially outwardly, and stop surfaces disposed radially outwardly of those resilient pieces disposed on opposite sides of the one deformable resilient piece for preventing the resilient pieces on opposite sides of the deformable resilient piece from being deformed radially outwardly.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
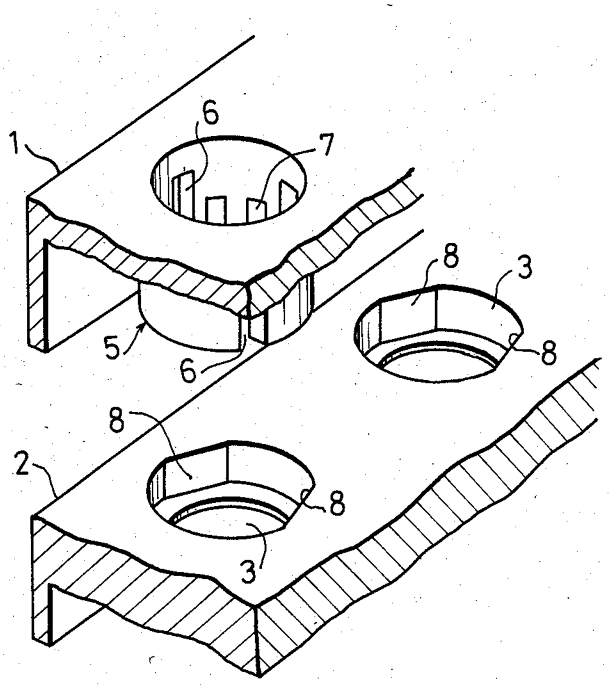
FIG. 1 is a fragmentary perspective view, partly in cross section, of upper and lower cases of a band selector switch of the present invention.
Figure 2:
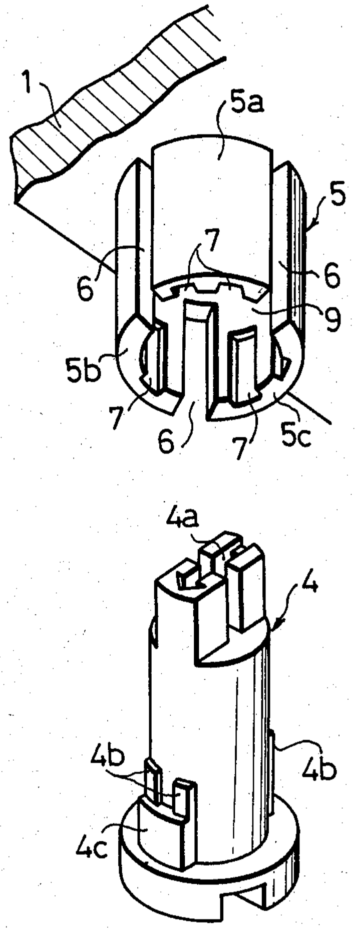
FIG. 2 is an exploded perspective view of a rotor and a sleeve.

As shown in FIG. 1, a casing comprises an upper case 1 and a lower case 2 which are secured together in interfitting engagement. The lower case 2 has an array of holes 3. In FIG. 1, a band selector switch includes a rotor 4 rotatably inserted in each of the holes 3. The rotor 4 has a slot defined in its upper surface 4*a* for insertion therein a jig such for example of a screwdriver, and two pairs of click teeth 4*b* formed on a lower outer circumferential surface thereof, the click tooth pairs being diametrically spaced from each other. A stop projection 4*c* is integrally formed with one of the pairs of click teeth 4*b* at lower portions thereof, the stop projection 4*c* being thicker than the click teeth 4*b*.

The upper case 1 has on its lower surface an array of sleeves 5 in registry with the holes 3 in the lower case 2. Each of the sleeves 5 has three axial slits 6 dividing the sleeve 5 into three resilient pieces 5*a*, 5*b*, 5*c*. One of the resilient pieces 5*a* is shorter than the other resilient pieces 5*b*, 5*c* to provide a recess 9 in a lower end of the sleeve 5. Each of the resilient pieces 5*a*, 5*c* has a pair of axial click grooves 7 defined in its inner peripheral surface for engagement with the click teeth 4*b* on the rotor 4. The resilient piece 5*b* has only one axial click groove 7 defined in its inner peripheral surface for engagement with one of the click teeth 4*b*.

When the upper and lower cases 1, 2 are assembled together, the longer resilient pieces 5*b*, 5*c* enter a corresponding one of the holes 3 in the lower case 2 with the shorter resilient piece 5*a* positioned on the upper surface of the lower case 2. The hole 3 has stop surfaces 8 formed therein for preventing the longer resilient pieces 5*b*, 5*c* from being deformed radially outwardly. Thus, only the shorter resilient piece 5*a* is freely deformable in the radially outward direction, but the longer resilient pieces 5*b*, 5*c* are prevented at their portions closer to the shorter resilient piece 5*a* from being opened radially outwardly.

Figure 3:
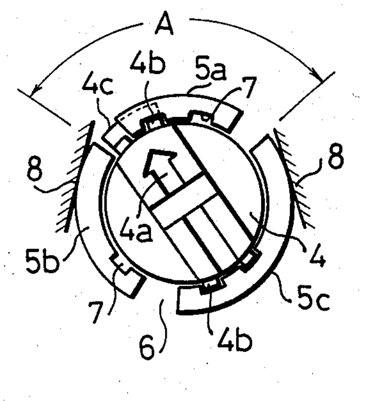
FIG. 3 is a plan view of the rotor and the sleeve as interfitted.
Figure 4:
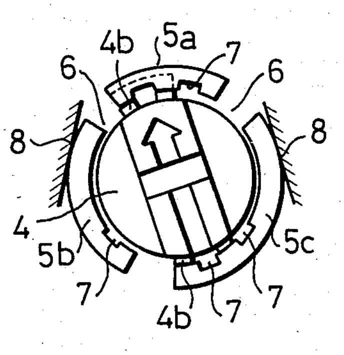
FIG. 4 is a view similar to FIG. 3, but showing click teeth on the rotor spreading the sleeve.

Band selecting operation will be described with reference to FIGS. 3 and 4.

The rotor 4 is inserted from below into the lower case 2, and the upper and lower cases 1, 2 are assembled together. The rotor 4 has an upper portion projecting from the corresponding sleeve 5 mounted on the upper case 1. At this time, one pair of click teeth 4*b* on the rotor 4 is received in the click grooves 7 defined in the shorter resilient piece 5*a*, while the other pair of click teeth 4*b* is fitted in the click grooves 7 defined in one of the longer resilient pieces 5*b*, 5*c*. Therefore, the rotor 4 is retained in a desired position. For band selection, the tip of a jig such as a screwdriver is inserted in the slot 4*a* in the upper end of the rotor 4, and turned to rotate the rotor 4. The click teeth 4*b* then move out of the click grooves 7 to spread the sleeve 5 radially outwardly. Continued rotation of the rotor 4 causes the click teeth 4*b* to engage in adjacent click grooves 7, whereupon the rotor 4 is retained in position again. During such rotation of the rotor 4, the lower resilient pieces 5*b*, 5*c* are prevented at their portions closer to the shorter resilient piece 5*a* from being forced radially outwardly. Accordingly, the click teeth 4*b* that have been received in the click grooves 7 in the shorter resilient piece 5*a* will not enter the longer resilient pieces 5*b*, 5*c*. This allows the rotor 4 to turn about its own axis in an angular range shown by A in FIG. 3 for proper band selection. The stop projection 4*c* of a larger thickness formed on the lower portion of one pair of click teeth 4*b* is positioned in the recess 9 downwardly of the shorter resilient piece 5*a*. The stop projection 4*c* will then engage side edge of the longer resilient pieces 5*b*, 5*c* to limit the angular interval of the rotor 4 to the range A. Consequently, band selection on this band selection switch construction is rendered more reliable in operation.

With the foregoing arrangement, the rotor 4 is limited in its angular movement to a certain angular range by the longer resilient pieces 5*b*, 5*c* held against the stop surfaces 8 and also by the stop projection 4*c* engageable with the side edges of the longer resilient pieces 5*b*, 5*c*. Such reliable angular movement of the rotor 4 allows a proper band selecting operation.

Although a certain preferred embodiment has been shown and described, it should be understood that many changes and modifications may be made therein without departing from the scope of the appended claims.

What is claimed is:

1. A rotary switch comprising a fixed sleeve having a plurality of axially extending resilient pieces arranged circumferentially separated by axial slits defined in said sleeve, a rotor having click teeth on its outer circumferential surface and being rotatably fitted in said sleeve, said resilient pieces of said sleeve having click grooves defined in inner peripheral surfaces thereof for engaging said click teeth, one of said resilient pieces being deformable radially outwardly to provide a yielding click action when said rotor is moved at certain angular positions, and stop surfaces disposed radially outwardly of the other resilient pieces disposed on opposite sides of said one deformable resilient piece for preventing said other resilient pieces from being deformed radially outwardly, thereby preventing rotation of said rotor at other angular positions.

2. A rotary switch according to claim 1, wherein said sleeve has three said resilient pieces defined by said axial slits, one of said three resilient pieces being shorter than the other two and deformable radially outwardly.

3. A rotary switch according to claim 1, wherein said deformable resilient piece has two of said click grooves, said rotor having two of said click teeth for engaging in said two click grooves.

4. A rotary switch according to claim 1, wherein said click teeth on said rotor are substantially diametrically opposite to each other, all of said resilient pieces of said sleeve having said click grooves.

5. A rotary switch comprising a fixed sleeve having a plurality of axially extending resilient pieces arranged circumferentially separated by axial slits defined in said sleeve, a rotor having click teeth and a stop projection on its outer circumferential surface and being rotatably fitted in said sleeve, said resilient pieces of said sleeve having click grooves defined in inner peripheral surfaces thereof for engaging said click teeth, one of said resilient pieces being deformable radially outwardly to provide a yielding click action when said rotor is moved at certain angular positions and having a recess defined therein, said stop projection of said rotor being disposed for free movement in said recess of said one deformable resilient piece and being engageable with side edges of the other resilient pieces on opposite sides of said recess for limiting said rotor to a certain range of angular movement.

6. A rotary switch according to claim 5, wherein said deformable resilient piece has two of said click grooves, said rotor having two of said click teeth for engaging in said two click grooves.

7. A rotary switch according to claim 5, wherein said stop projection has a thickness larger than that of said click teeth.

8. A switch according to claim 5 wherein said recess is formed by said one deformable resilient piece having an axial length shorter than the other resilient pieces.

* * * * *